(12) United States Patent
Kamoda et al.

(10) Patent No.: US 6,546,209 B2
(45) Date of Patent: Apr. 8, 2003

(54) CAMERA

(75) Inventors: Takashi Kamoda, Saitama (JP); Yasuhiko Tanaka, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/789,723

(22) Filed: Feb. 22, 2001

(65) Prior Publication Data

US 2001/0012454 A1 Aug. 9, 2001

(30) Foreign Application Priority Data

Feb. 29, 2000 (JP) ........................................ 2000-054686

(51) Int. Cl.[7] .............................................. G03B 17/02
(52) U.S. Cl. ........................ 396/535; 396/538; 396/539
(58) Field of Search ................................ 396/535, 538, 396/539, 540, 541, 6

(56) References Cited

U.S. PATENT DOCUMENTS 5,585,876 A * 12/1996 Kobayashi .................. 396/387
5,884,112 A * 3/1999 Funahashi et al. .......... 396/535

FOREIGN PATENT DOCUMENTS

| JP | 6-035047 | 2/1994 |
| JP | A 2000-19603 | 1/2000 |

* cited by examiner

Primary Examiner—Russell Adams
Assistant Examiner—Andrew Sever
(74) Attorney, Agent, or Firm—Young & Thompson

(57) ABSTRACT

A camera includes a cassette holder chamber for receiving insertion of a photo film cassette. A take-up chamber takes up photo film drawn from the photo film cassette. An exposure chamber is disposed between the cassette holder chamber and the take-up chamber, for introducing object light to the photo film to provide an exposure. A part holder chamber is disposed between the cassette holder chamber and the exposure chamber. A main capacitor for flash emission has a tubular shape, and is contained in the part holder chamber. A through opening is formed between the cassette holder chamber and the part holder chamber, for internally connecting the cassette holder chamber and the part holder chamber to one another.

8 Claims, 5 Drawing Sheets

CAMERA

BACKGROUND OF THE INVENTION

1. Field of the Invention

The present invention relates to a camera. More particularly, the present invention relates to a camera of which a horizontal size is reduced and which can be manufactured at a low cost.

2. Description Related to the Prior Art

A camera includes a camera body part as a base part for disposition of a photographing mechanism or shutter mechanism. The camera body part has an exposure aperture formed to open in the rear to define a frame region of photo film. The camera body part also includes a cassette holder chamber, a take-up chamber and an exposure chamber, which is disposed between the cassette holder chamber and take-up chamber and extends rearwards to the exposure aperture. The cassette holder chamber contains a photo film cassette. The take-up chamber takes up the photo film drawn from the photo film cassette. The exposure chamber constitutes a light-shielding tunnel, and receives a lens barrel in a slidable manner. The camera body part should have sufficient rigidity. To reduce the size of the camera, it is necessary to consider positions in which various parts are disposed on the camera body part.

JP-A 06-035047 discloses an example of the camera in which parts are so disposed as to reduce the space. A main capacitor in a flash unit with a relatively great size is disposed between the exposure chamber and cassette holder chamber in an orientation extending vertically.

U.S. Pat. No. 5,585,876 (corresponding to JP-A 08-262559) discloses the camera in which high rigidity of the camera body part is ensured. The camera body part is formed from plastic material including glass fiber. Also in this document, a guide member guides the photo film from the photo film cassette along a feeding path, and formed as a single piece separate from the camera body part. The guide member is formed from plastic material without including the glass fiber, so as to prevent occurrence of scratches of the photo film.

The frame region in the photo film defined by the exposure aperture receives light including components, such as a component from the taking lens directly to the frame region of the photo film, and a component reflected by the inside of the exposure chamber toward the frame region. The latter component is harmful light to cause flare in an object image to lower the quality of the print. In the above known camera, the exposure aperture is provided with portions projecting toward the optical axis. So a surface of an inside of the exposure chamber is farther from the optical axis than the portions of the exposure aperture. This prevents occurrence of flare by reducing the harmful light.

However, the camera of JP-A 06-035047 has a problem in the horizontal size of the camera is considerably long, because a distance between the exposure chamber and cassette holder chamber is very high.

If this disposition is combined with the camera disposed in U.S. Pat. No. 5,585,876 (corresponding to JP-A 08-262559), there remains a problem in difficulties in a molding process. A front portion of an inner surface of the exposure chamber projects toward the optical axis. The exposure aperture projects in the position behind the inner surface, so as to complicate the inner shape of the exposure chamber to cause the difficulties. Thus, the number of steps in the manufacturing process increases considerably. The manufacturing cost of the camera increases seriously.

SUMMARY OF THE INVENTION

In view of the foregoing problems, an object of the present invention is to provide a camera in which a horizontal size is reduced.

Another object of the present invention is to provide a camera of which a manufacturing cost is reduced.

In order to achieve the above and other objects and advantages of this invention, a camera includes a cassette holder chamber for receiving insertion of a photo film cassette. A take-up chamber takes up photo film drawn from the photo film cassette. An exposure chamber is disposed between the cassette holder chamber and the take-up chamber, for introducing object light to the photo film to provide an exposure. A part holder chamber is disposed between the cassette holder chamber and the exposure chamber. A first part has a tubular shape, and is contained in the part holder chamber. A through opening is formed between the cassette holder chamber and the part holder chamber, for internally connecting the cassette holder chamber and the part holder chamber to one another.

In a preferred embodiment, the through opening allows the first part partially to enter the cassette holder chamber, or allows the photo film cassette partially to enter the part holder chamber.

Furthermore, a light-shielding sheet is secured to the through opening, for preventing light from entry into the cassette holder chamber through the part holder chamber.

The first part is a main capacitor for flash emission.

Furthermore, a taking lens focuses the object light on the photo film. A lens barrel is contained in the exposure chamber movably forwards and backwards, for containing the taking lens.

According to another aspect of the invention, an exposure aperture is formed behind the exposure chamber. A support member is disposed behind the part holder chamber, for contacting and supporting the photo film fed between the exposure aperture and the cassette holder chamber.

Furthermore, a body part has the cassette holder chamber, the take-up chamber, the exposure chamber and the part holder chamber, includes upper and lower side lines and a first lateral side line of the exposure aperture, and is formed from first material including glass fiber. The support member is secured to the body part, includes a second lateral side line of the exposure aperture, and is formed from second material.

The exposure chamber has an optical axis at a center along which the object light is introduced. Furthermore, a part holder chamber is disposed between the cassette holder chamber and the exposure chamber, for containing a first part having a tubular shape, the part holder chamber having at least one portion disposed closer to the optical axis than the second lateral side line.

BRIEF DESCRIPTION OF THE DRAWINGS

The above objects and advantages of the present invention will become more apparent from the following detailed description when read in connection with the accompany drawings, in which.

DETAILED DESCRIPTION OF THE PREFERRED EMBODIMENT(S) OF THE PRESENT INVENTION

Figure 1:
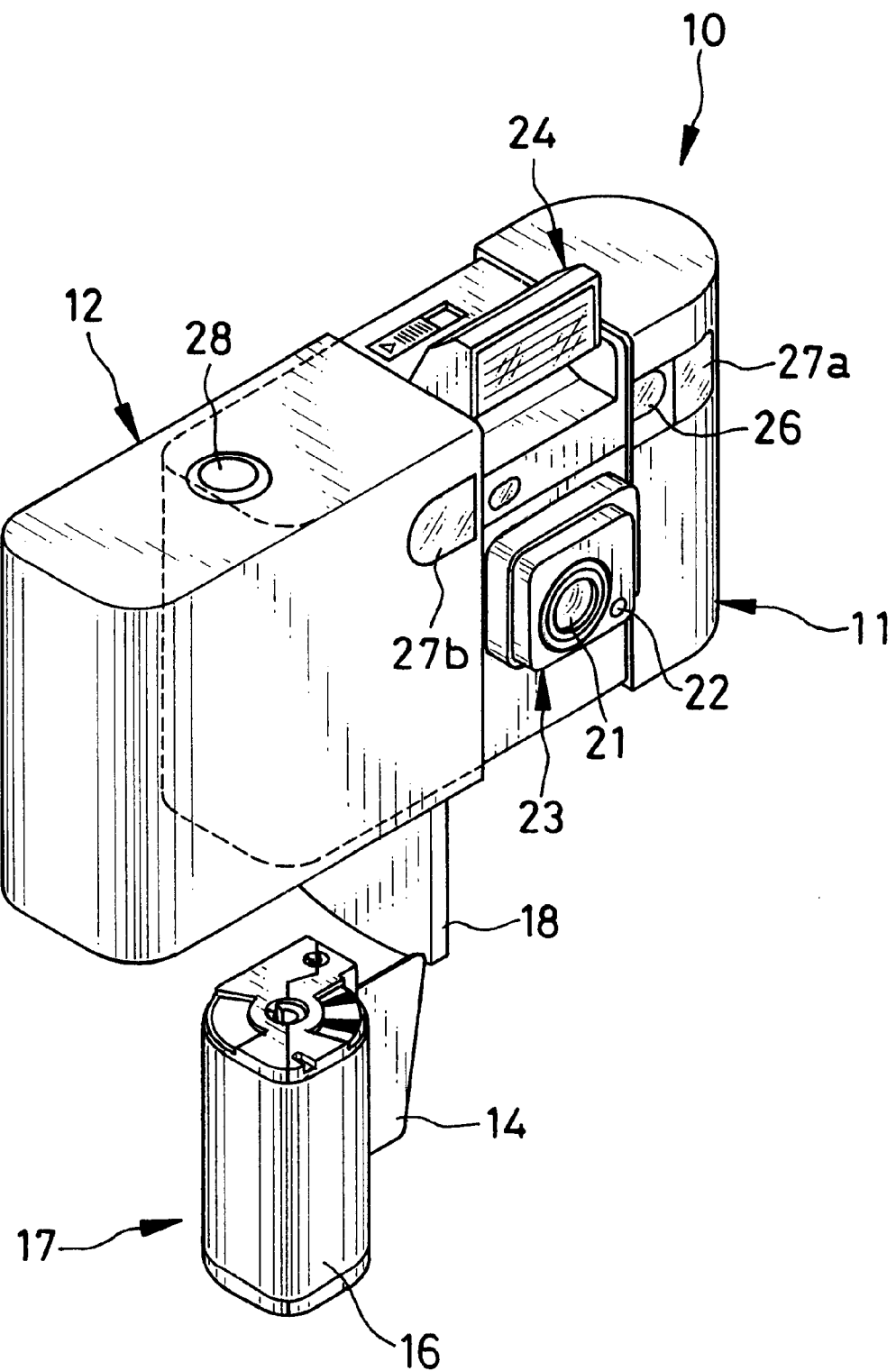
FIG. 1 is a perspective illustrating a camera with a photo film cassette.

In FIG. 1, a camera 10 of the present invention is depicted. A camera body 11 has a box shape, and has various elements for taking an exposure. A sliding cover 12 covers a portion of the camera body 11 and slidable on the camera body 11. The sliding cover 12 is formed from lightweight material with high strength, examples of which are plastic material, aluminum, titanium and the like.

When the camera 10 is not used, nearly the entirety of the camera body 11 is contained in the sliding cover 12 in a compact manner. Portability of the camera 10 is raised as outer protruding or retreating portions are reduced. To take an exposure, the camera body 11 is drawn from the sliding cover 12, which is used as a grip.

A photo film cassette 17 is used with the camera 10, and includes a cassette shell 16 and a roll of photo film 14 contained therein. A lower lid 18 is disposed on a lower face of the camera body 11, and opened for loading or unloading the photo film cassette 17. When the sliding cover 12 is drawn from the camera body 11, the lower lid 18 is uncovered. The lower lid 18 is openable while the sliding cover 12 is drawn from the camera body 11. Also, a battery chamber lid (not shown) is disposed on the lower face of the camera body 11, and is openable while the sliding cover 12 is drawn from the camera body 11.

The sliding cover 12 is also a switching operation member, and when slid to an effective position, turns on a power source of the camera body 11, and when slid to a position different from the effective position, turns off the power source of the camera body 11.

Front and upper faces of the camera body 11 are provided with a lens barrel 23, a flash emitter 24 of a pop-up type, a viewfinder 26, a rangefinding projecting window 27a and a rangefinding receiving window 27b. The lens barrel 23 includes a taking lens 21 and a photometric receiving window 22. A photographing optical system or the taking lens 21 is incorporated in the lens barrel 23, and when a power source for the camera 10 is turned off, is collapsed in the camera body 11, and when the power source for the camera 10 is turned on, is advanced from the camera body 11.

A shutter switch is incorporated in the camera body 11, for causing a releasing operation in a shutter unit. A shutter release button 28 is externally operable to turn on the shutter switch. The rear of the camera body 11 is provided with a liquid crystal display (LCD) panel and various kinds of switches, such as a zoom switch. The camera body 11 includes a body part, a shutter mechanism, a flexible printed circuit board, and outer plates. The printed circuit board includes circuit elements printed thereon. The shutter mechanism and the printed circuit board are secured to the body part, to which the outer plates are secured.

Figure 2:
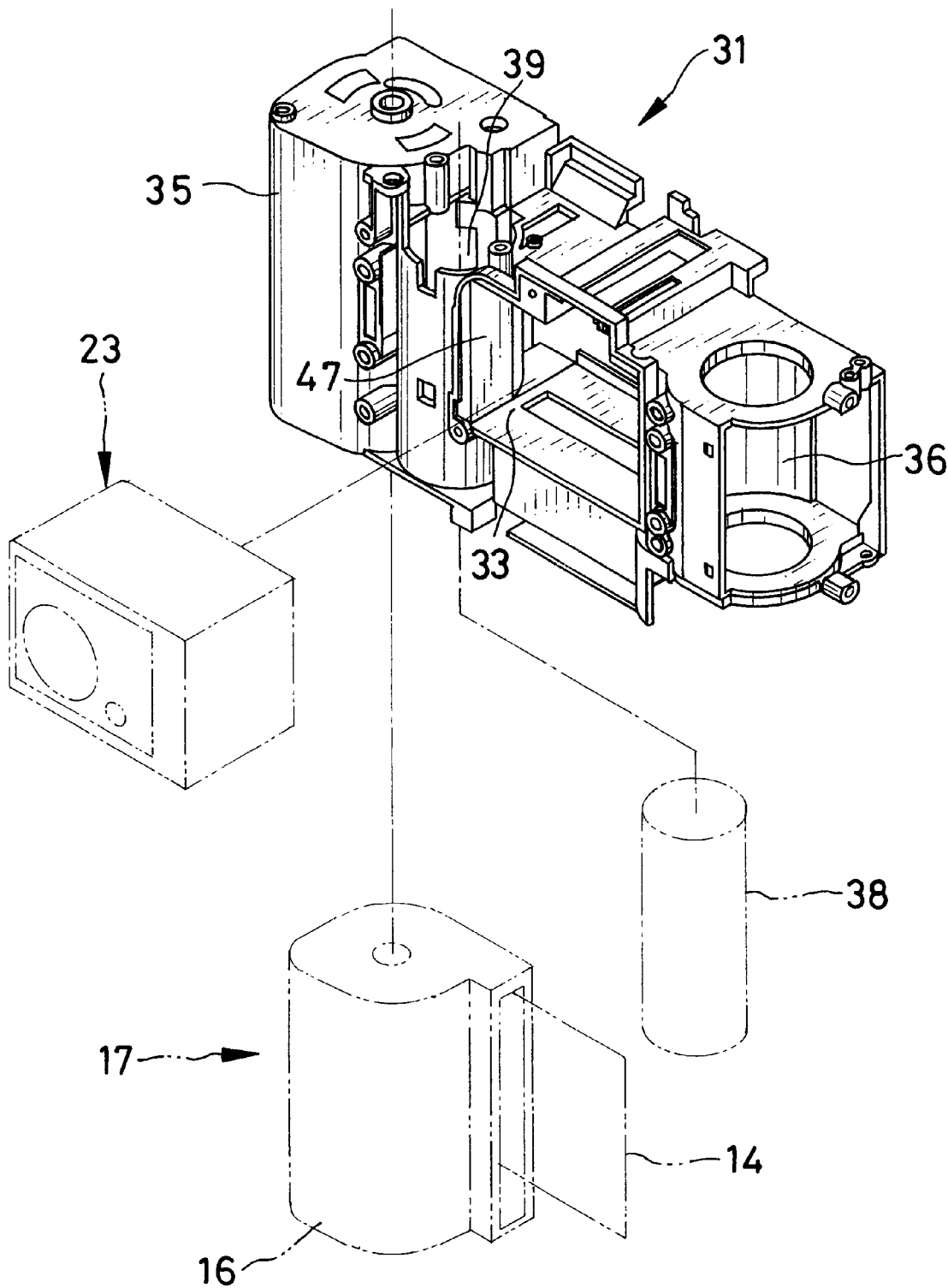
FIG. 2 is a perspective illustrating a body part of the camera together with a lens barrel and a main capacitor with the photo film cassette.
Figure 3:
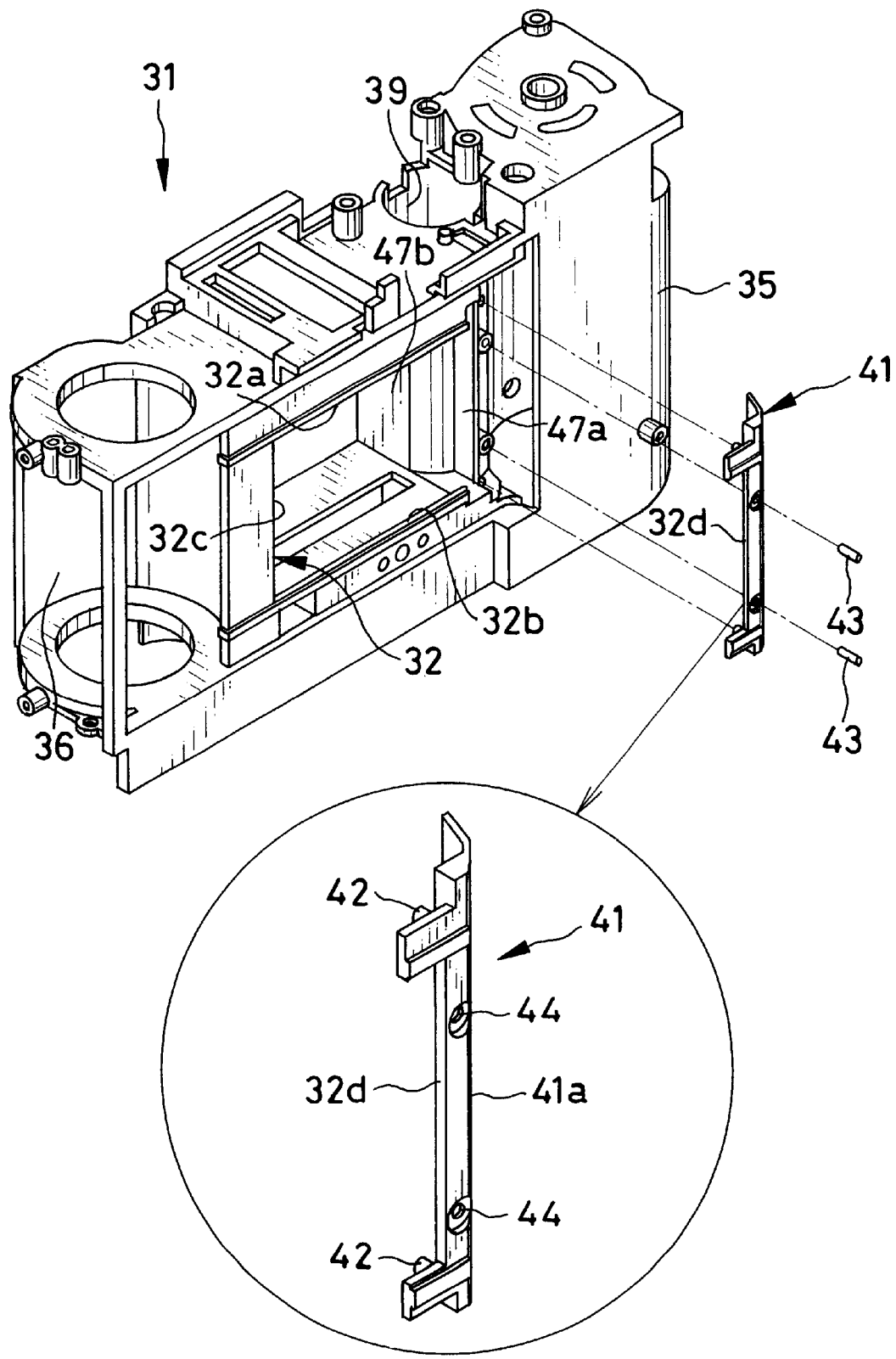
FIG. 3 is an exploded perspective illustrating the body part and a support member at the exposure aperture.

In FIGS. 2 and 3, the camera body 11 includes a body part 31, which has an exposure aperture 32, an exposure chamber 33, a cassette holder chamber 34 and a take-up chamber 36.

Figure 4:
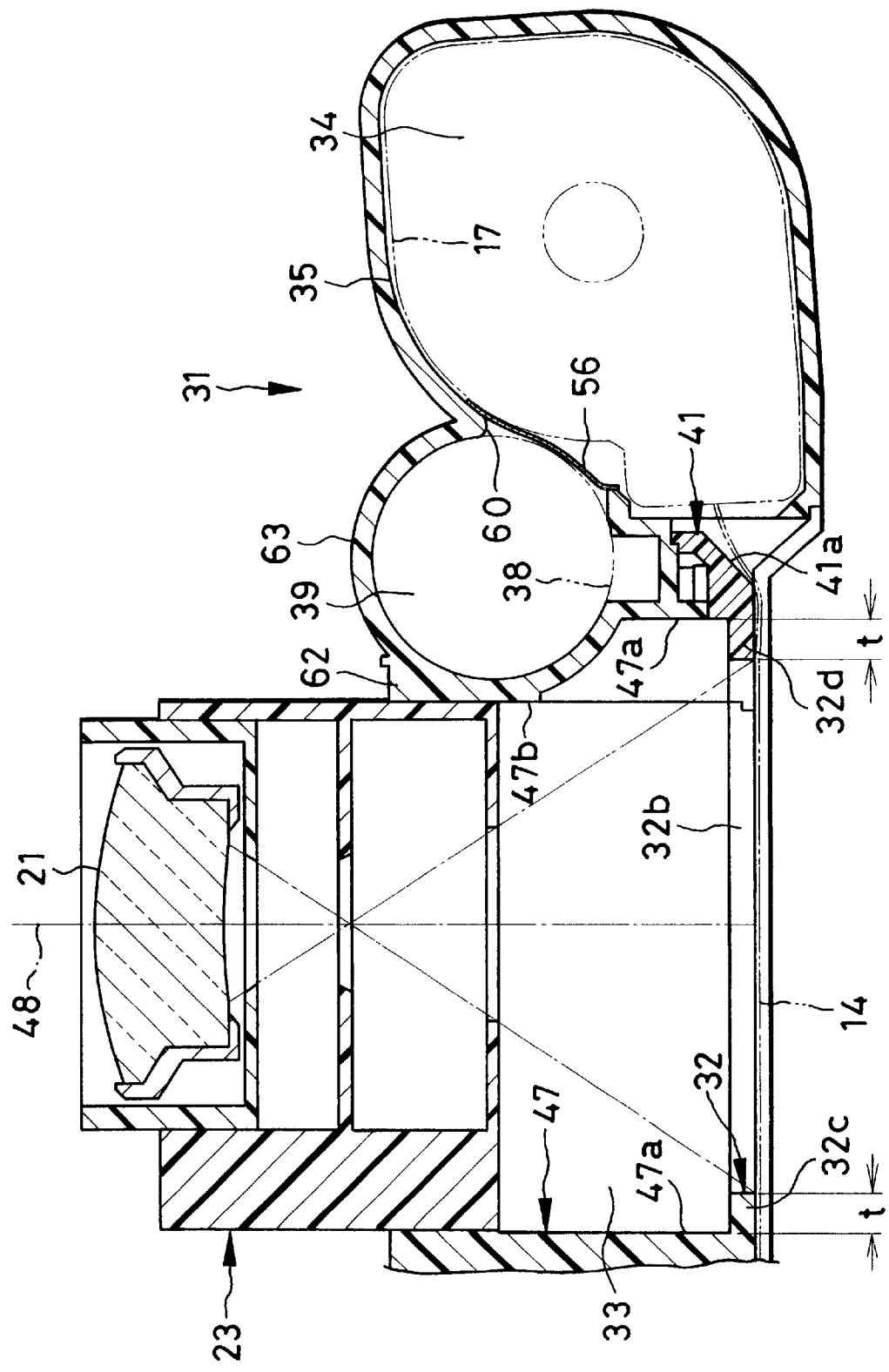
FIG. 4 is a horizontal section, partially broken, illustrating a camera body having the support member.

The exposure aperture 32 defines a frame region of the photo film 14. The exposure chamber 33 is formed to extend from the exposure aperture 32 toward the front, and contains the lens barrel 23. The cassette holder chamber 34 and the take-up chamber 36 are so disposed that the exposure chamber 33 lies between those. In FIG. 4, the cassette holder chamber 34 contains the cassette shell 16. The take-up chamber 36 contains a portion of the photo film 14 from the cassette shell 16 in a roll form wound about a take-up spool. An outer wall 35 defines a portion of a peripheral wall of the cassette holder chamber 34.

A part holder chamber 39 is disposed between the exposure chamber 33 and the cassette holder chamber 34, and has a nearly cylindrical shape. A flash main capacitor 38 as first part is included in an electronic flash unit, and is contained in the part holder chamber 39. A battery chamber is disposed under the exposure chamber 33, and contains a battery as power source for the camera body 11.

The exposure aperture 32 has a quadrilateral shape including an upper side line 32a, a lower side line 32b, a first lateral side line 32c and a second lateral side line 32d. The first lateral side line 32c is close to the take-up chamber 36 and extends vertically. The second lateral side line 32d is close to the cassette holder chamber 34 and extends vertically. Among those, the body part 31 includes the first lateral side line 32c and a greater part of the upper and lower side lines 32a and 32b. There are rail faces on the rear of the upper and lower side lines 32a and 32b for guiding feeding of the photo film 14 by contact with longitudinal edges of the photo film 14.

The body part 31 is a molded piece formed from hard plastic material including glass fiber by injection molding. Various portions of the body part 31 are formed by the molding operation, including outer walls defining the exposure chamber 33, the cassette holder chamber 34 and the take-up chamber 36, bosses, holes and slots for supporting various elements, and the like. As the hard plastic material is used, the body part 31 can have high rigidity.

A support member 41 is a separate piece from the body part 31, and secured to the body part 31 between the exposure aperture 32 and the cassette holder chamber 34. A support face 41a is formed on the rear of the support member 41, and guides feeding of the photo film 14 toward the exposure position by contact with the emulsion surface of the photo film 14 drawn from the cassette shell 16 of the photo film cassette 17. Among the side lines 32a 32d of the exposure aperture 32, the support member 41 includes the second lateral side line 32d and small parts of the upper and lower side lines 32a and 32b.

Positioning pins 42 are formed to protrude from the support member 41. Also, there are holes 44 formed in the support member 41. Connecting pins 43 as plastic pieces are inserted in the holes 44. The support member 41 is positioned by inserting the positioning pins 42 into positioning holes formed in the body part 31. After inserting the connecting pins 43 into the holes 44 and holes in the body part 31, the connecting pins 43 are caulked and thus fixed on the body part 31. Therefore, the support member 41 is firmly secured to the body part 31, and does not have an offset state upon contact with the photo film 14.

The support member 41 is formed from comparably soft plastic material without including glass fiber. In FIG. 4, the support face 41a contacts and bends the photo film 14 for the purpose of feeding the photo film 14 to the exposure position. The emulsion surface of the photo film 14 is pressed against the support face 41a tightly. In consideration of this, the support member 41 is formed from the sufficiently soft material and has no roughish fibrous surface so as to prevent the photo film 14 from being scratched by feeding.

An inner wall 47 of the exposure chamber 33 has a rear portion 47a. Ridges with the side lines 32a–32d of the exposure aperture 32 protrude toward an optical axis 48 from the rear portion 47a by a length. In general, object light incident through the taking lens 21 includes a component directly toward a frame region in the photo film 14, and also a component reflected by the inner wall 47 and directed to the frame region. The latter component is harmful, causes flare in an object image, and lowers image quality. Consequently, the ridges with the side lines 32a–32d protrude toward the optical axis 48. The rear portion 47a of the inner wall 47 is more distant from the optical axis 48 than the side lines 32a–32d, for the purpose of preventing occurrence of flare by reducing harmful component of light.

The part holder chamber 39 is disposed between the exposure chamber 33 and the cassette holder chamber 34. A front portion 47b of the inner wall 47 of the exposure chamber 33 lies nearer to the optical axis 48 than the rear portion 47a. The rear portion 47a has a retracted shape between the second lateral side line 32d and the front portion 47b, to complicate the shape of the inner wall 47. Should the second lateral side line 32d be included in the body part 31, the number of steps in a process of molding the exposure chamber 33 might be extremely high.

Figure 5:
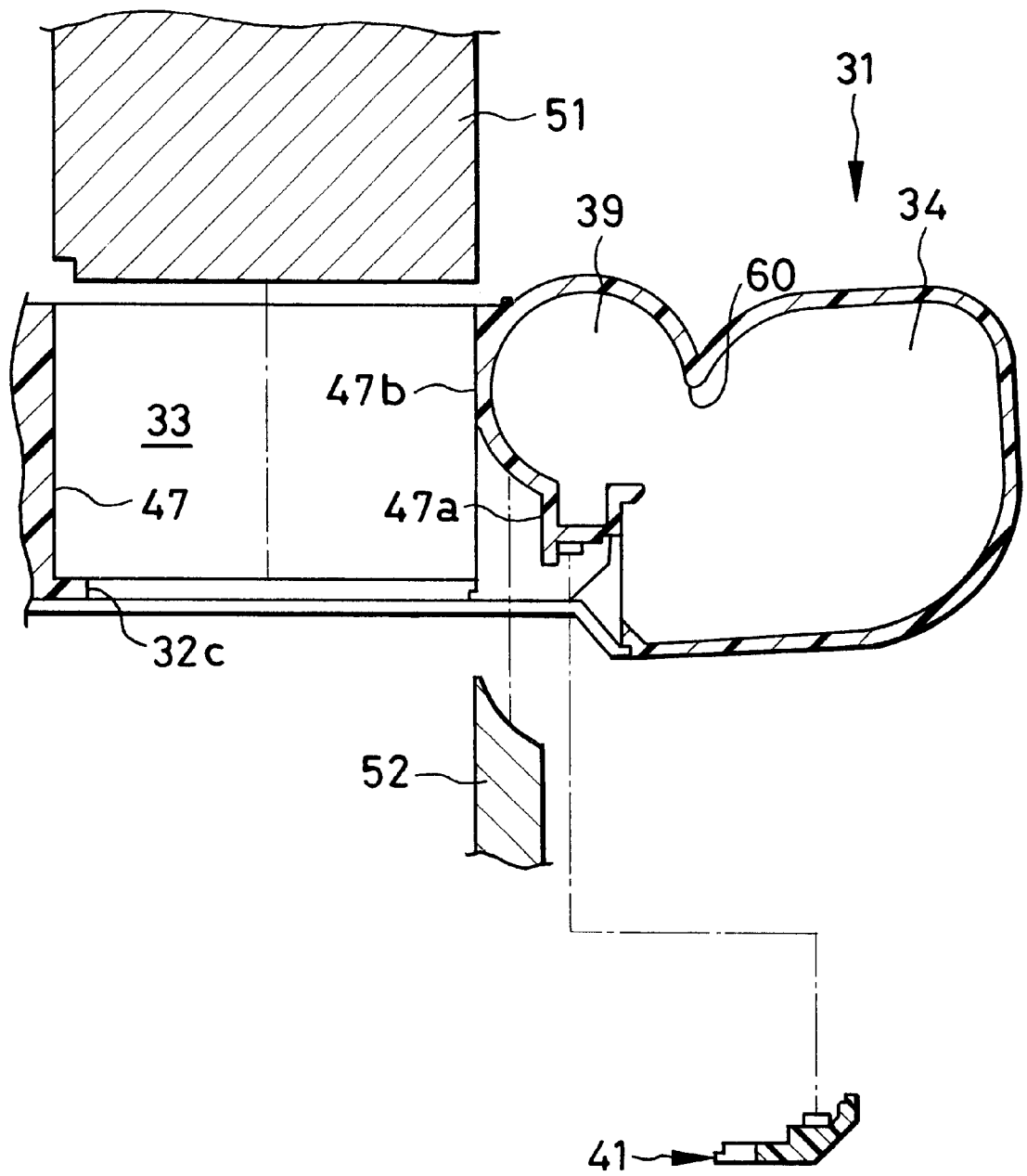
FIG. 5 is an explanatory view in a horizontal section, illustrating the body part and molds for forming the body part.

As the second lateral side line 32d is a separate piece from the body part 31. A combination of a first mold 51 and a second mold 52 in FIG. 5 makes it possible to mold the exposure chamber 33. The first mold 51 is removed easily in a direction toward the front. The second mold 52 is removed easily in a direction toward the rear. A rise of the manufacturing cost can be suppressed, as the number of steps in the manufacturing process is not very high.

There is no partition to separate the part holder chamber 39 and the cassette holder chamber 34 from one another. A portion of the flash main capacitor 38 enters a through opening 60, and is located inside the cassette holder chamber 34. Therefore, a horizontal size of the camera 10 is shortened by disposing the cassette holder chamber 34 close to the exposure.chamber 33.

A light-shielding sheet 56 is secured to an edge of the through opening 60 in which the cassette holder chamber 34 and the part holder chamber 39 are interconnected. The light-shielding sheet 56 prevents entry of light into the cassette holder chamber 34 through the part holder chamber 39. The light-shielding sheet 56 is a piece of thin plastic film, and attached to the body part 31 with adhesive agent.

In the body part 31, an outer wall 62 defines the exposure chamber 33. A reinforcing portion 63 extends in front of the part holder chamber 39, and connects the outer wall 62 to the outer wall 35 defining the cassette holder chamber 34. The reinforcing portion 63 covers the front of the flash main capacitor 38, and is included in the piece of the body part 31. The reinforcing portion 63 is effective in keeping high rigidity of the body part 31 by compensating for the through opening 60 formed in a partition between the part holder chamber 39 and the cassette holder chamber 34.

In the manufacturing process of the camera 10, the body part 31 and other parts are formed by molding. The body part 31 is produced by injection of melted plastic material with glass fiber into a mold set of plural molds, which have shapes for the cassette holder chamber 34, the take-up chamber 36, the exposure chamber 33, the part holder chamber 39 and the like. When the plastic material is hardened, the molds are removed. As the support member 41 is a separate piece, the first and second molds 51 and 52 can be easily removed in directions toward respectively the front and the rear from the exposure chamber 33.

The body part 31 can have high rigidity, because molded from the hard plastic material, and reinforced by the reinforcing portion 63. On the other hand, the support member 41 is formed by injection molding from the plastic material without the glass fiber.

When the part manufacturing step is completed, the partsand other electric parts are transferred to an assembling station. Then the various elements are assembled on the body part 31, including the support member 41, the flash main capacitor 38, the flash emitter 24, the lens barrel 23, elements of the viewfinder, a winding mechanism, a motor and the like. Also, the light-shielding sheet 56 is attached to the body part 31. The flexible printed circuit board is mounted on the body part 31, to which the outer plates are secured, to obtain the camera body 11.

When the camera body 11 is obtained, the sliding cover 12 is secured to the camera body 11 to complete the assembling process. Then the camera 10 is transferred to an inspection process, and subjected to tests of the lens barrel, the flash unit and the like. Afterwards, the camera 10 is packaged individually, packaged externally, and shipped.

A user having purchased the camera 10 slides the sliding cover 12, and opens the lower lid 18 and the battery chamber lid, and loads the camera body 11 with the photo film cassette 17 and the battery. Sliding of the sliding cover 12 turns on the power source. The lower lid 18 is closed, so as to cause the photo film 14 to be drawn out of the cassette shell 16.

As the cassette holder chamber 34 is shielded by the light-shielding sheet 56 from light, the photo film 14 does not become exposed or fogged. The emulsion surface of the photo film 14 is supported by the support face 41a, and fed toward the exposure position. As the support member 41 of the soft plastic material does not have a roughish fibrous surface, no scratch occurs in the surface of the photo film 14 during the feeding.

Caulking of the connecting pins 43 firmly fixes the support member 41 to the body part 31. There is no occurrence of positioning in contact with the photo film 14. The second lateral side line 32d will not be offset as a portion of the exposure aperture 32.

A field to be photographed is observed through the viewfinder. Then an exposure is taken. Upon depressing the shutter release button 28, the shutter mechanism is released to introduce object light through the taking lens 21. As the inner wall 47 of the exposure chamber 33 is shaped to come away from the optical axis 48 in comparison with a surface of the side lines 32a–32d. An object image can be obtained clearly without influence of flare, because there is little harmful light incident upon the emulsion surface of the photo film 14.

In the above embodiment, the flash main capacitor 38 is contained in the part holder chamber 39. Alternatively, the part holder chamber 39 according to the invention may contain a motor, a battery or other parts shaped tubularly. If a battery is contained in the part holder chamber 39, it is necessary to shield light from the part holder chamber 39 more reliably, because entry of ambient light should be avoided at the time of renewing the part holder chamber 39. In the above embodiment, the light-shielding sheet 56 operates to prevent entry of ambient light into the cassette holder chamber 34 from the part holder chamber 39. However, the light-shielding sheet 56 may not be used. It is also preferable instead of the light-shielding sheet 56 to use a structure for preventing entry of ambient light to both of the part holder chamber 39 and the cassette holder chamber 34, for example a suitably modified shape of the body part 31, or a blocking lid for the part holder chamber 39.

In the above embodiment, the reinforcing portion 63 is included in the body part 31 to connect the cassette holder chamber 34 and the exposure chamber 33. However, the reinforcing portion 63 may be a separate member secured to the body part 31. Furthermore, the reinforcing portion 63 may not be used if sufficient rigidity is obtained by a suitable shape of the body part 31. A front portion of the part holder chamber 39 may have a gap without the reinforcing portion 63.

In the above embodiment, the body part 31 is formed from the plastic with the glass fiber unlike the support member 41 formed from the plastic without glass fiber. The body part 31 has higher rigidity than the support member 41. Furthermore, it is possible to form the body part 31 from any suitable type of first material with rigidity, and to form the support member 41 from any suitable type of second material including no glass fiber and having a non-fibrous surface without causing scratches.

Also, the photo film cassette for use with the camera of the invention may be the 135 type or IX 240 type.

Also, the camera according to the invention may be a lens-fitted photo film unit as a single use type.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera including a cassette holder chamber for receiving insertion of a photo film cassette, a take-up chamber for taking up photo film drawn from said photo film cassette, and an exposure chamber, disposed between said cassette holder chamber and said take-up chamber, for introducing object light to said photo film to provide an exposure, said camera comprising:

a part holder chamber, disposed between said cassette holder chamber and said exposure chamber, for containing a first part having a tubular shape; and a through opening, formed between said cassette holder chamber and said part holder chamber, for internally connecting said cassette holder chamber and said part holder chamber to one another.

2. A camera as defined in claim 1, wherein said through opening allows said first part partially to enter said cassette holder chamber, or allows said photo film cassette partially to enter said part holder chamber.

3. A camera as defined in claim 1, further comprising a light-shielding sheet, secured to close said through opening, for preventing light from entry into said cassette holder chamber through said part holder chamber.

4. A camera as defined in claim 3, wherein said first part is a main capacitor for flash emission.

5. A camera as defined in claim 3, further comprising:

a taking lens for focusing said object light on said photo film; and a lens barrel, contained in said exposure chamber movably forwards and backwards, for supporting said taking lens.

6. A camera as defined in claim 1, further comprising:

an exposure aperture formed behind said exposure chamber;

a support member, disposed behind said part holder chamber, for contacting and supporting said photo film when said photo film is fed between said exposure aperture and said cassette holder chamber.

7. A camera as defined in claim 6, further comprising a body part, having said cassette holder chamber, said take-up chamber, said exposure chamber and said part holder chamber, including upper and lower side lines and a first lateral side line of said exposure aperture, and formed from first plastic material including glass fiber;

wherein said support member is secured to said body part, includes a second lateral side line of said exposure aperture, and is formed from second plastic material.

8. A camera including a cassette holder chamber for receiving insertion of a photo film cassette, a takeup chamber for taking up photo film drawn from said photo film cassette, and an exposure chamber, disposed between said cassette holder chamber and said take-up chamber, for introducing object light to said photo film to provide an exposure, said camera comprising:

a body part, having said cassette holder chamber, said take-up chamber and said exposure chamber, and formed from first plastic material including glass-fiber;

a support member, secured to said body part between said cassette holder chamber and said exposure chamber, for contacting and supporting said photo film being fed, said support member being formed from second plastic material; and an exposure aperture formed behind said exposure chamber, having upper and lower side lines and first and second lateral side lines, wherein said upper and lower side lines and said first lateral side line are defined by said body part, and said second lateral side line is defined by said support member;

wherein said exposure chamber has an optical axis at a center along which said object light is introduced;

further comprising a part holder chamber, disposed between said cassette holder chamber and said exposure chamber, for containing a first part having a tubular shape, said part holder chamber having at least one portion disposed closer to said optical axis than said second lateral side line.

* * * * *